(12) United States Patent
Knapp

(10) Patent No.: US 6,341,731 B1
(45) Date of Patent: Jan. 29, 2002

(54) THERMOSTATIC MIXING VALVE WITH SEQUENTIAL MANUAL CONTROL

(75) Inventor: Alfons Knapp, Biberach/Riss (DE)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 09/646,974
(22) PCT Filed: May 11, 1999
(86) PCT No.: PCT/US99/10280
  § 371 Date: Sep. 25, 2000
  § 102(e) Date: Sep. 25, 2000
(87) PCT Pub. No.: WO99/59045
  PCT Pub. Date: Nov. 18, 1999

(30) Foreign Application Priority Data

May 12, 1998 (IT) ........................... 98A000393

(51) Int. Cl.⁷ ............................................. G05D 23/13
(52) U.S. Cl. ................. 236/12.14; 137/625.14
(58) Field of Search ................... 236/12.14, 12.2, 236/12.21, 12.22; 137/625.14

(56) References Cited

U.S. PATENT DOCUMENTS

| 1,932,404 | A | 10/1933 | Hamblin |
| 2,910,242 | A | 10/1959 | Freismuth et al. |
| 4,327,758 | A | 5/1982 | Uhlmann |
| 4,475,684 | A | 10/1984 | Garlick et al. |
| 4,923,115 | A | 5/1990 | Sekoguchi et al. |
| 5,340,018 | A | 8/1994 | MacDonald |
| 5,535,948 | A | 7/1996 | Kahle et al. |

FOREIGN PATENT DOCUMENTS

| IT | 1107182 | 11/1985 |
| WO | WO9530939 | 11/1995 |
| WO | WO9530940 | 11/1995 |
| WO | WO9635984 | 11/1996 |

Primary Examiner—William E. Tapolcai
(74) Attorney, Agent, or Firm—Reising, Ethington, Barnes, Kisselle, Learman & McCulloch, PC

(57) ABSTRACT

A thermostatic regulator (30) for a single handle mixer valve (12) has a sensor (32) mounted in a mixed water chamber (34) for sensing the temperature of the outlet water. The sensor is connected to a valve (20) that is mounted in the cold water supply line (18) to restrict the availability of cold water when the water in the hot water line (16) is down below a set temperature.

20 Claims, 3 Drawing Sheets

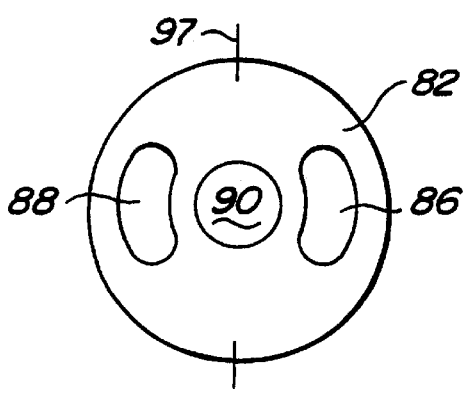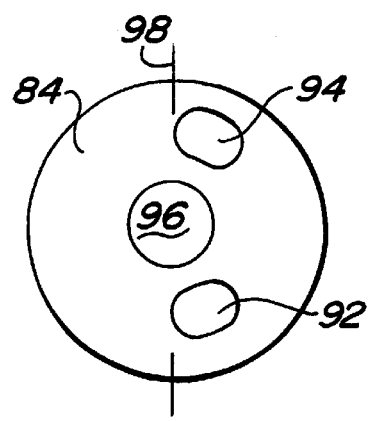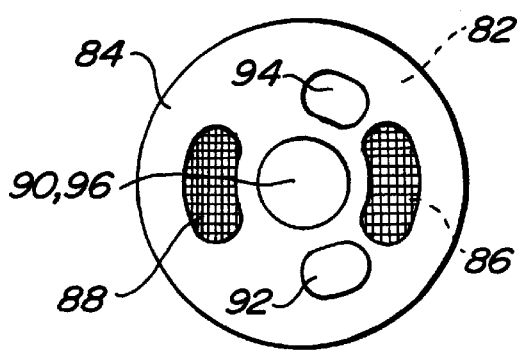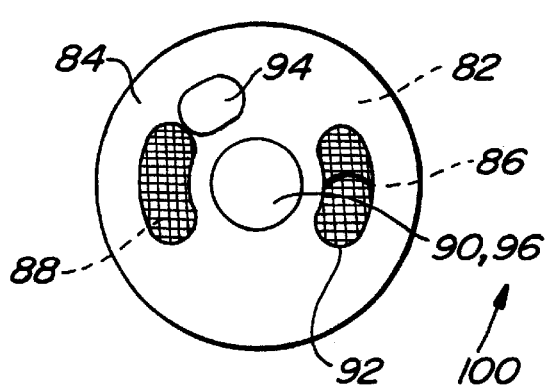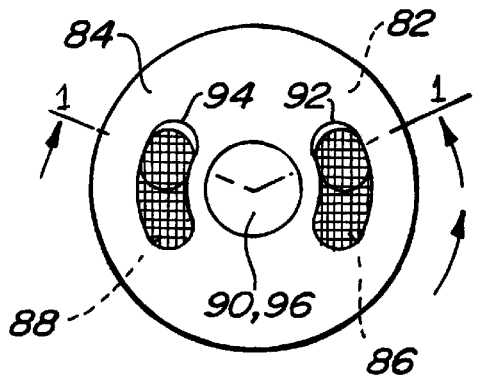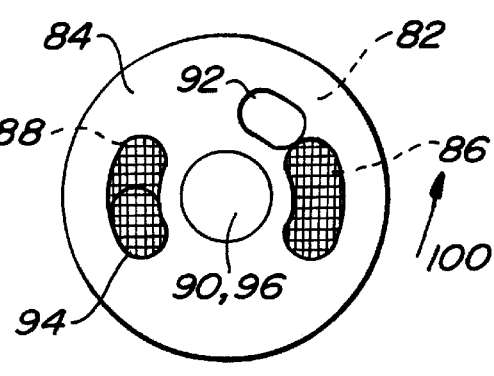

THERMOSTATIC MIXING VALVE WITH SEQUENTIAL MANUAL CONTROL

TECHNICAL FIELD

This invention relates to a mixing valve for cold and hot water of the type including a thermostatic device and a manual control device acting upon the inlet ports that pass the cold and hot water to a mixing region.

BACKGROUND OF THE INVENTION

According to Italian Patent No. 1,107,182 by the same inventor, a thermostatic faucet includes a mixer with manual control that sets a mixing ratio between cold water and hot water and a thermostatic device that, depending on the actual temperature of the mixed water, controls a choke valve inserted on the hot water supply to the manual control mixer so as to modify the mixing ratio set in order to maintain within a certain range the temperature of the mixed water that is actually delivered.

According to Italian Patent No. 1,279.194, by the same inventor, a thermostatic faucet includes a mixer with manual control that sets a mixing ratio between cold water and hot water and a thermostatic device that, depending on the actual temperature of the mixed water, controls a choke valve inserted on the cold water supply to the manual-control mixer so as to modify the mixing ratio set in order to maintain, within a certain range, the temperature of the mixed water that is actually delivered.

Both of these devices incorporate a certain material separation between the manually controlled mixer valve and the thermostatic device that complicates its design and installation.

According to Italian Patent No. 1,2273,178, a thermostatic mixing device to which one can also operate as a faucet includes inlet ports for cold water and hot water, arranged at the sides of a central outlet pipe. A mixing chamber receives water from regulated hot and cold inlet passages and a thermostatically controlled distribution valve operates so as to control the opening and closing in opposite directions of the respective regulated inlet hot and cold passages so as to maintain, within a certain and adjustable range, the temperature of the discharged mixed water. This device can be provided with a volume flow control valve for manually and simultaneously changing the useful opening of both hot and cold inlet pipes. The volume flow valve controls only the flow volume but does not have any effect on the mixing action or relative proportional of flow of hot and cold water. This device presents a general and particularly advantageous structure, although it does entail the inconvenience that temperature regulation is rather poorly sensitive and gives rise to a temporary over regulation phenomena (of referred to as an "overshoot"). Temporary overshoot occurs when upon movement of the temperature adjustment mechanism to a position corresponding to a given temperature, one initially gets an effective temperature change of discharged water that is considerably more than the desired change. The desired temperature change is reached only after a period of time after the thermostatic device had a chance to compensate. The adjustment of the temperature, controlled by the thermostatic element, is achieved by manual control of the position of the thermostatic element and the distribution valve operably connected to it, which directly affects the opening of the respective hot and cold inlets.

SUMMARY OF THE INVENTION

In accordance with one aspect of this invention, a thermostatic mixing valve can be used alternatively as a thermostatic faucet or as a thermostatic device for feeding one or several apparatus, each of which is provided with its own faucet, or with one or several faucets installed downstream from the thermostatic device. The thermostatic mixing valve combines the advantages of the prior art devices without entailing the installation or thermostatic overshoot inconveniences. In particular, the invention is a compact structure that is easy to make and install and ensures a high degree of adjustment sensitivity. It further can provide a guarantee against the delivery of excessively hot water also in the presence of abnormalities in water supply and, when it is used as a thermostatic faucet, it incorporates a manually operated sequential type control valve mounted in series with the thermostatic valve.

Preferably, the thermostatic mixing valve comprises two inlet ports for cold water and hot water, a mixing chamber, passages between the inlet ports and the mixing chamber, a discharge port from the mixing chamber for mixed water, a thermostatic element arranged at least partly in the mixing chamber, and an annular distribution slide valve controlled by the thermostatic element. Both inlet ports and discharge port are in a central body radially inside the annular distribution slide valve. The annular distribution slide valve is arranged so as to restrict the passage between only one of the inlet ports and the mixing chamber. A flow and mixing adjustment valve with manual control of the sequential type is mounted to control the two inlet ports.

The adjustment of the temperature of discharged water is set manually by the action of the manually operable sequential type control valve for the flow and the mixing action without the manual action directly changing the position of the thermostatic element and the distribution slide valve so that one can systematically eliminate the phenomenon of temporary overshoot. Furthermore, the action of adjusting the distribution slide valve, controlled by the thermostatic element, always works in a counteracting direction from the direction of manual action thereby limiting its effect. The consequence of two counteracting activities is that one must make a longer movement of the manual control to achieve a desired change. The gradation of adjustment is elongated and the profile of change is flatter. The quickness and precision of thermostatic adjustment are then enhanced by the fact that the distribution slide valve works so as to effectively restrict or increase flow cross section of only one of the inlet ports so that the mixing takes place due to the addition or restriction of only one flow to the volume of the other flow rather than through inverse variation of the volumes of the two flows.

In cases where the valve is used as a faucet, the manual operable sequential valve also intercepts or shuts off the delivered volume, functions as a non-return valve, and adjusts flow rate within certain limits. But the manual sequential valve inserted in the water supply lines can also be used as a thermostatic adjustment device for a water supply flow going to one or several apparatuses, each of which is provided with its own shut off and volume regulation valve or with one or several faucets inserted in the waterlines downstream from the thermostatic valves. In these cases, the manual control valve for the thermostatic valve is adjusted only to determine the desired temperature and not to intercept a shut-off water flow or regulate it.

In cases where one must ensure an upper limit of the temperature of the discharge water, the distribution slide valve is so positioned as to regulate, by the action of the thermostatic element, the cross-sectional area of the passage through which hot water passes from the pertinent inlet port to the mixing chamber.

On the other hand, in cases where it is not necessary to limit the temperature of the discharge water (for example, because hot water supply is provided at a limited or non-hazardous temperature), the distribution slide valve can also be arranged so as to regulate, by the action of the thermostatic element, the cross-sectional area of the passage through which cold water passes from the pertinent inlet port to the mixing chamber.

Preferably, when the valve is intended to be used a thermostatic faucet the manually operable sequential valve includes a pair of valve plates, preferably made of hard material with openings therethrough. A first fixed plate and a second moveable plate are in sliding contact with each other. The openings in the plates are positioned to ensure in succession a shut-off or intercept position, a range of sequential opening positions of the pertinent passage for cold water while retaining closure of passage for hot water, a range of positions for the sequential opening of a passage for hot water while retaining full opening of the passage for cold water and, finally a range of sequential closing of the passage for cold water while retaining full opening of the passage for the hot water. The two plates each present an outlet opening that is permanently open to the mixed flow.

As an alternative, the two ranges of positions can be replaced by a single range of positions in which there takes place a sequential opening of the passages for the hot water and simultaneously a sequential closing of the passages for the cold water.

The sequential action can be achieved, for example, with a plate valve structure that has a first plate that is symmetrical with respect to a diameter of the openings therethrough and with a second plate that is asymmetrically constructed with respect to a diameter of its openings, cooperating with the first plate openings. It is immaterial whether the first plate is fixed and the second plate is moveable or vice versa. In a particularly convenient arrangement, the sequential valve includes a fixed base plate intended to be mounted upon a supply and delivery housing, and a rotatable plate mounted rotatably on said base plate and which is manually operated. Preferably, the fixed base plate is mounted in the supply and delivery housing and the moveable part is mounted in a rotatable body of the valve and operable by a handle, lever, or knob.

The valve can be provided with an adjuster to determine and adjust the maximum temperature at which the delivered water can be adjusted. The adjuster adjusts the resting position of the thermostatic element and of the distribution slide valve connected to it. This device can include a cap that can be rotated by manual action, mounted through a working threaded connection to the rotatable body of the valve. As the cap is rotated relative to the rotatable body, the cap also axially shifts the support point to the thermostatic element.

In accordance with a broader aspect of the invention a thermostatic mixing valve has a base having two supply ports and a rotatable body mounted onto the base and operably connected to a first valving surface with a first and second inlet passages therethrough that are operably positioned adjacent the two supply ports for controlling volume flow into the housing. A second valving member is annular in shape and movable toward and away from an annular seat in proximity for restricting and controlling fluid only from said first inlet passage. The first inlet passage passes up through the annular seating surface within radial extent of said annular valving surface and having a downstream end in fluid communication with the annular seat and the annular valving member to provide a first annular flow path between the annular seat and the annular valving member from radially within the annular valving member to radially outside of the annular valving surface to a mixing chamber. The first inlet passage is sealed within the interior of said annular valving surface with respect to the second inlet passage from the supply ports to the mixing chamber. A thermostatic element is axially movably disposed within the mixing chamber and operably connected to the annular valving surface to move the annular valving surface axially toward and away from the annular seat for restricting controlling the flow form only the first inlet passage into the mixing chamber in response to the temperature of fluid in the mixing chamber. The mixing chamber is in fluid communication with an outlet exiting therefrom.

Preferably, the annular seat opposes an axial end of said annular valving member. The second inlet passage passes up through the first seating surface and through the interior of the annular valving surface within the radial extent of the annular valving surface and having a downstream end in unrestricted fluid communication with the mixing chamber.

Alternatively the second inlet passage ends below the annular valving member to allow free unrestricted flow about the annular valving member to the mixing chamber and the annular seat is positioned above the annular valving member and the first inlet passage passes up through the interior of the annular valving member.

Preferably, a return biasing spring is mounted within the radially confines of the annular valving member to axially move said annular valving member upon contraction of the thermostatic element.

In one embodiment the return biasing spring is mounted on the top of a central body within said rotatable body.

BRIEF DESCRIPTION OF THE DRAWINGS

Reference is now made to the accompanying drawings, in which:

FIG. 2 illustrates an embodiment of the fixed plate for the sequential manual operating valve for controlling the flow and the mixing action shown in FIG. 1;

FIG. 3 illustrates an embodiment of the movable plate for the sequential manual operating valve;

FIGS. 4 to 7 illustrate the movable plate of FIG. 3 rotated in various adjusting positions on the fixed plate of FIG. 2.

DETAILED DESCRIPTION OF THE PREFERRED EMBODIMENT

Figure 1:
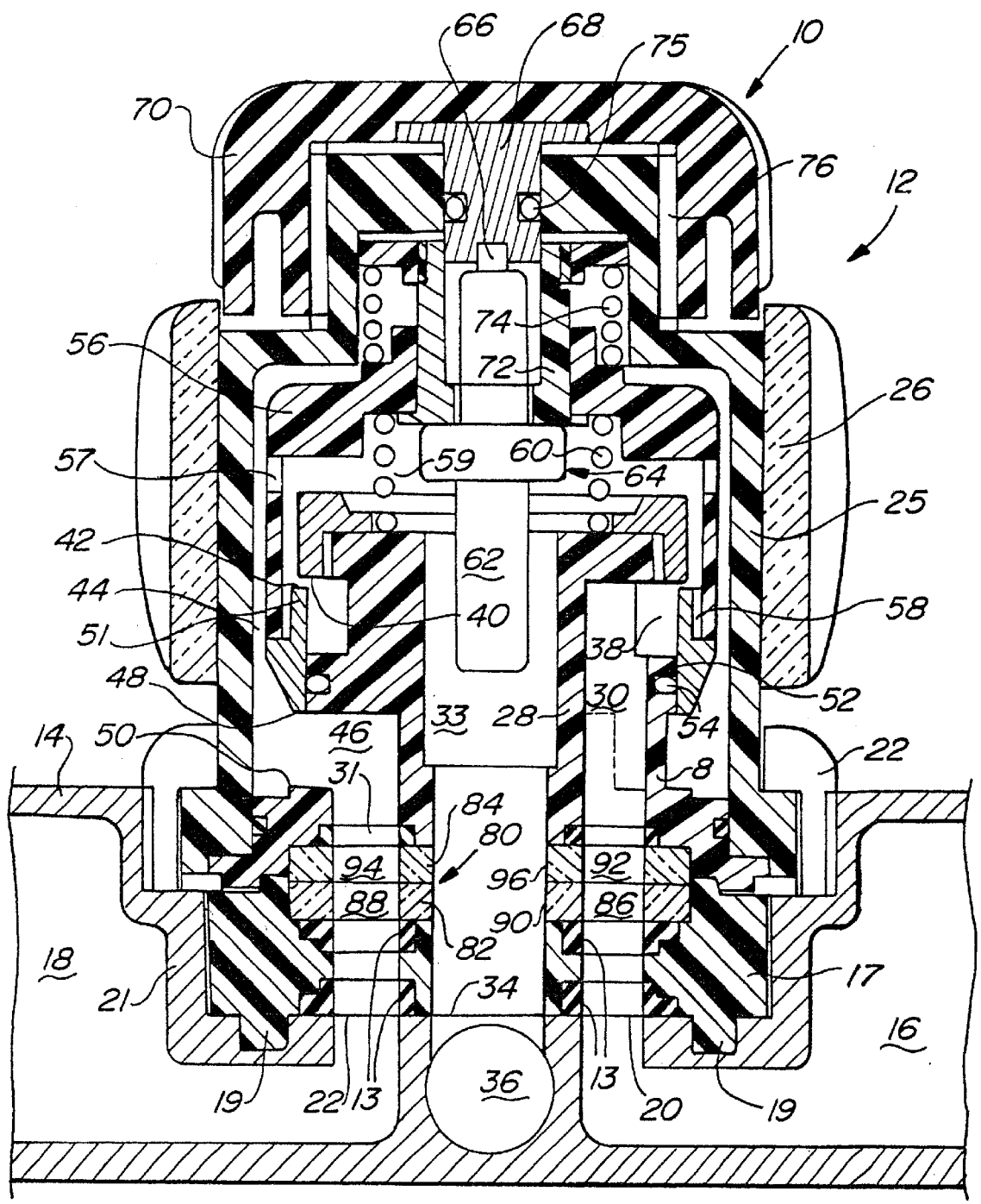
FIG. 1 is a segmented side elevational view illustrating a first embodiment of the thermostatic valve according to the invention.

Referring to FIG. 1, a thermostatic mixing valve 10 includes a rotatable handle body 12 that is rotatably mounted in piping fixture or other suitable piping fixture 14. The piping fixture 14 includes a cold water supply 16 and hot water supply 18. The rotatable handle body 12 is rotatably mounted to a faucet base 17 that is affixed within the fixture 14 by projection 19 inserted in the seat 21 of the fixture 14. The body 12 is retained to base 17 by collar 23 threaded into the seat 21 of fixture 14. Seals 13 are seated on base 17 about a cold water inlet port 20 and a hot water inlet port 22.

Rotatable body 12 comprises an inner shell 25 that can be quipped with a cosmetic operable handle or knob 26, preferably made of thermally insulating material, so shaped as to facilitate the manual operation for the rotation of rotatable body 12. Inside shell 25 there is arranged a central body member 28, which is fixed to shell 25 for rotation therewith. The central body 28 is intended to cooperate with a distribution annular slide valve 44.

The internal body member 28 has a cold water inlet passage 30 aligned with the cold water inlet port 20 and a hot water inlet passage 31 aligned with the cold water inlet port 22. A central mixed water outlet 33 is in communication with discharge port 34 and outlet 36 in fixture 14. The passage 30 has an annular shaped downstream end 40 adjacent an annular valve seat 40. The downstream end is also adjacent the axial upper valve lip 42 of an annular slide valve 44. Downstream end 46 of hot water inlet 31 is annular in shape and is unrestricted by the wide spacing between the lower end 48 of valve 44 and opposing annular surface 50. There is also a sufficient annular gap between the rotatable body 25 and valve 44 and its mounting collar 57 to provide an unrestricted passage to flow opening 57 and into mixing chamber 59.

Valve seat 40 is secured to the internal body member 28. The passage 30 passes axially through the annular valve 44 within its radial confines. The internal body member 28 has an intermediate seal seat 52 that seats a gasket 54 that seals off the passage 30 from 31 within the axial extend of the annular slide valve 4T.

The annular slide valve 44 is affixed to the collar 56 via a threaded engagement 58. The collar 56 and slide valve 44 outlines a mixing chamber 59 between flow ports 57 and mixed water outlet 33. A spring 60 is mounted within the annular valve 44 and collar 56 and is seated on the top seat 40 on the top of the central body 28. The spring 60 biases the valve 44 to engage the seat 40 and close off passage 38. The collar 56 extends above the internal body section 28 and is operatively affixed through a safety spring release collar 72 and spring 74 to body section 62 of thermostatic element 64. The thermostatic element 64 has an expanding piston leg 66 that engages an abutment member 68 that is mounted in adjustment handle 70. The adjustment handle 70 has a threaded connection 76 to shell 25 and an appropriate seal 75 for mechanically raising and lowering the thermostatic assembly 64 within the shell 25. The body section 62 may extend into the central outlet passage 33 of the internal body 28.

The mixing valve includes a sequential flow rate control valve 80 that includes two ceramic disc plates 82 and 84. Fixed ceramic disc plate 82 is mounted in base 17. Rotatable (or movable) ceramic disc plate 84 is mounted to a bottom of the center body 28. The sequential flow rate control valve 80 is mounted upstream from the annular slide valve 44. The fixed ceramic disc plate 82 has respective cold and hot supply ports 86 and 88 and a centrally located mixed water outlet port 90. The movable ceramic disc plate 84 has a cold water inlet 92 and hot water inlet 94 and a centrally located outlet aperture 96. Aperture 96 is in constant alignment with outlet port 90 of fixed ceramic disc plate 82 and central outlet passage 33 of body 28 and discharge port 34. The rotation of the handle 26, and shell 25 with center body 28 rotates the ceramic disc plate 84 with respect to disc plate 82 to selectively align or misalign the inlets 92 and 94 with inlets 86 and 88 to control the flow rate of the hot and cold water.

As clearly illustrated in FIG. 2, openings 86 and 88 of fixed plate 82 are symmetrically positioned with respect to a central diameter 97 of the fixed plate. The openings 86 and 88 have arced, slotted shapes. Other shapes may also be employed. Inlet openings 92 and 94 of the movable plate 84, as illustrated in FIG. 3, are asymmetrical with respect to a central diameter 98 of the movable plate 84. Diameter 98 of moveable plate 84, when the plates 82 and 84 are in the intercept or shut-off position, as shown in FIG. 4, corresponds to the diameter 96 of the fixed plate. It is also possible to select other arrangements of the openings 86, 88, 92 and 94 that are equally suitable for bringing about correct operation (specified below). Furthermore, plates 82 and 84 can switch places such that plate 82, with its openings can become moveable and plate 84 with its opening can become fixed.

Plates 82 and 84 together provide for the sequential adjustment of the flow and the mixing action, cooperating as shown in FIGS. 4 to 7 as a function of the rotation imparted to rotatable body 12 of the thermostatic valve with respect to fixed base 17.

In FIGS. 4 to 7, the two plates 82 and 84 are shown with movable plate 84 superimposed over fixed plate 82. Openings 92 and 94 of mobile plate 84 thus are in view, while openings 86 and 88 of fixed plate 82 (marked by graph-paper-like lines) are entirely or partly covered by mobile plate 84.

In the position illustrated in FIG. 4, openings 92 and 94 of movable plate 84 are completely misaligned from openings 86 and 88 of fixed plate 82. This is, therefore, an intercept or shut-off position. On the other hand, discharge outlets 90 and 96 are permanently aligned in this position, as in all other positions of plates 82 and 84, so that outlet passage 33 of central body 28 of the valve will permanently communicate with outlet discharge 36 of fixture 14.

In the position illustrated in FIG. 5, movable plate 84 has been rotated by a certain angle in a counterclockwise direction (along arrow 100) with respect to the position in FIG. 4. In the entire range of positions, between the positions shown in FIGS. 4 and 5, the passage opening 92 of movable plate 84 becomes partly or totally aligned to opening 86 of fixed plate 83, while opening 94 of movable plate 84 retains total misalignment with opening 88 of fixed plate 82. Therefore, in the rotation from the position in FIG. 4 to the position in FIG. 5, there is a progressively growing flow rate that is offered to the cold water, while the hot water remains intercepted or shut off.

In the position illustrated in FIG. 6, movable plate 24 is further rotated by a certain angle in the clockwise direction (along arrow 100) with respect to the position in FIG. 5. In the entire range of positions between the positions shown in FIGS. 5 and 6, the passage opening 94 of movable plate 84 becomes partly or totally aligned to opening 88 of fixed plate 82 while opening 92 of movable plate 84 continues to retain substantially complete alignment with opening 86 of fixed plate 82. Therefore, in the passage rotation from the position in FIG. 5 to the position in FIG. 6, there is progressively growing flow rate that is offered to the hot water, while the passage offered to the cold water remains fully open. There is thus a progressive addition of hot water to the cold water. The axial profile in FIG. 1 shows the passages for both the cold water and the hot water as being open which corresponds to the profile marked along line I—I shown in FIG. 6.

Finally, in the position shown in FIG. 7, the movable plate has again been rotated by a certain angle in the counter-clockwise direction (along arrow 100) with respect to the position in FIG. 6. In the entire range of positions between the positions shown in FIGS. 6 and 7 passage opening 94 of movable plate 84 continues to retain substantially complete alignment with opening of fixed plate 82, while opening 92 of movable plate 84 gradually becomes totally misaligned from opening 86 of fixed plate 82. Therefore, in the rotation from the position in FIG. 6 to the position in FIG. 7, a progressively decreasing flow rate is offered to the cold water, whereas the passage opened to the hot water remains fully open. There is thus a progressive passage from mixing action to the delivery of only hot water.

As an alternative, the two ranges of intermediate positions between the positions of FIGS. 5 and 7 can be replaced by a single range in which a gradually growing passage is offered to the hot water, while the passage offered to the cold water gradually and simultaneously decreases.

The two plates 82 and 84, with their openings 90 and 96, therefore provide a sequential control valve 80 for flow and the mixing action, which can be controlled manually by rotating body 12 of the valve using handle 26 that operates a shell 25. With the help of this manual sequential control valve 80, one can set a cold water volume to mixing ratio, which are intended to be subsequently corrected by the action of the thermostatic device 64.

The description refers to the case of a thermostatic mixing valve that can be used as faucet with a shut off position. In cases where, on the other hand, the valve is intended to work as a supplier for one or several apparatuses and where the function of intercepting and adjusting the volume is downstream from this valve 10 the intercept or shut off position and the range of positions corresponding to a progressively growing passage offered to the cold water, while the hot water remains shut off, can be eliminated.

The thermostatic device works in the following manner. The mixing chamber 59 receives hot water through flow ports 27, while cold water flows from ring-shaped chamber 38 in respective proportions that are set manually by the sequential control valve 80 previously described. The hot and cold water are mixed in mixing chamber 59 and discharged through outlet passage 33, through discharge port 34 and outlet 36 in fixture 14. This mixed water surrounds thermostatic element 64, which assumes the same temperature and expands or contracts correspondingly. The expansion or contraction of thermostatic element 64 moves the distribution slide valve 44 down or up respectively. When the water warms the thermostatic element 64, it dilates, moves slide valve 44 down and the annular seat 42 moves away from the surface of seat 40 thus widening the passage between annular chamber 38 and mixing chamber 59. This reduces the resistance against the flow of cold water and the volume of this flow increases, reducing the temperature of the mixed water. If at that point the manual sequential control valve 80 is again adjusted to increase the temperature, then there will also be an increase in the dilation of thermostatic element 64, and the passage between annular chamber 38 and mixing chamber 29 becomes even wider with even less resistance thus further increasing the flow rate of cold water. One can thus see that the thermostatic device 64 tends to act against manual adjustment so that the latter must be performed with greater amplitude to attain the desired temperature in the mixed water. The fine adjustment capability for small temperature changes is thus enhanced.

Furthermore, any voluntary adjustment of the manual sequential valve to adjust temperature does not directly cause an axial shift in the distribution slide valve, an axial shift that must successively be compensated by the thermostatic device to attain a condition of equilibrium. Thus, there will be no phenomena of temporary overshoot.

The operation of handle 70 in this thermostatic valve axially moves the entire thermostatic element 64 and collar 56 with slide valve 44 up and down. However, contrary to what is customary, the movement of handle 70 does not help adjust the temperature but rather to adjust the maximum limit of the temperature that can be reached (under normal conditions of supplies) in the drawn mixed water.

It is obvious that, on the other hand, the temperature of the delivered water can rise higher than this limit eventually up to the point where it reaches the temperature of the hot water supplied only supply pipe 18 if there are abnormalities or, at the utmost, if there is a total lack of supply from cold water supply pipe 16. Nevertheless, the embodiment described is advantageous both in cases where the temperature of the hot water supplied by pipe 18 is not dangerous and by the fact that the passage of the hot water into the valve is entirely free (except for voluntary control) and is therefore particularly favorable in cases where the hot water is supplied at low pressure.

Figure 8:
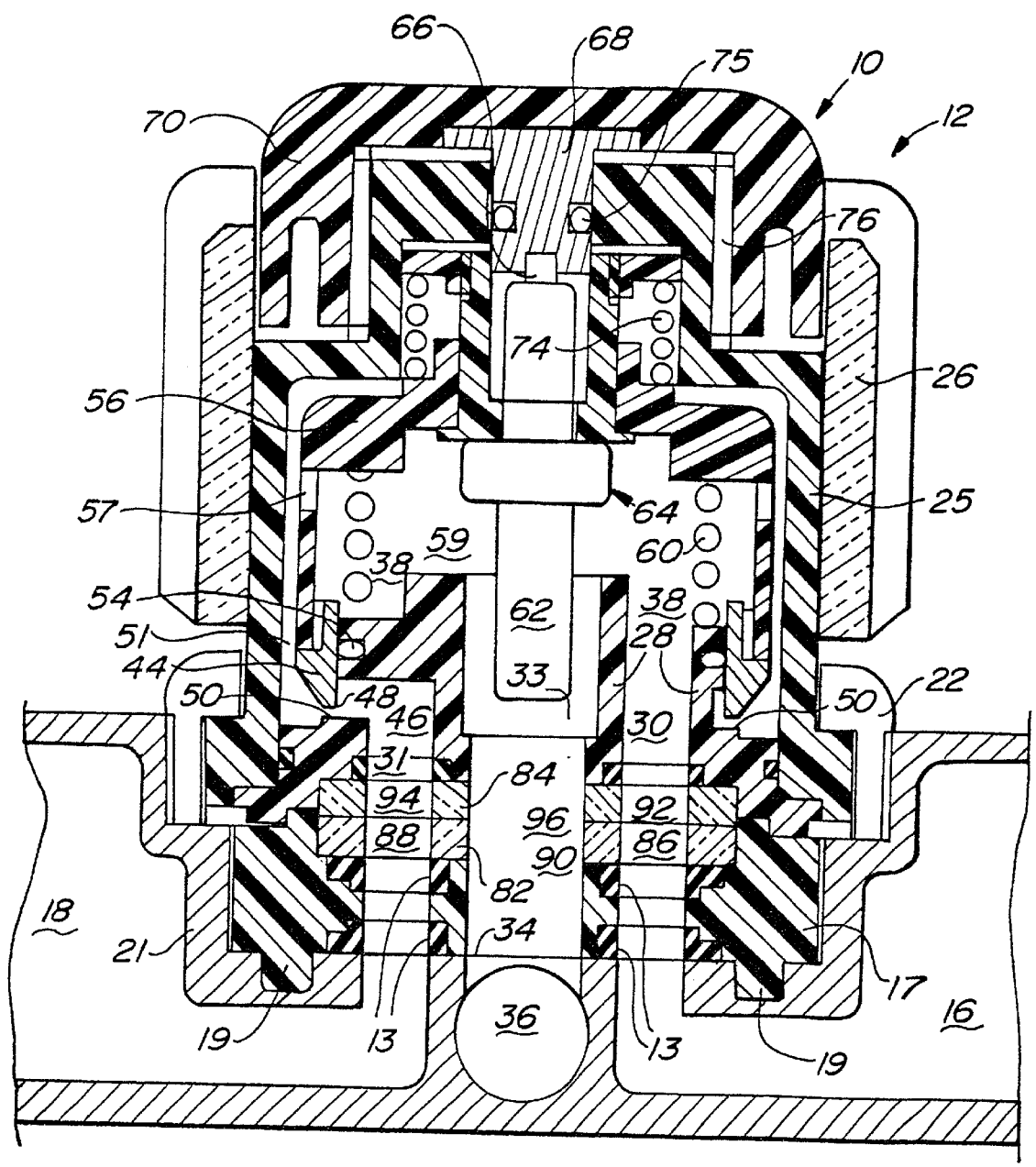
FIG. 8 illustrates a segmented view similar to the one in FIG. 1 displaying a second embodiment of the thermostatic valve according to the invention.

If one wishes to introduce a device that prevents the delivery of hot water with high temperature, one can employ the embodiment according to FIG. 8. The latter to a great extent corresponds to the previously described embodiment and the corresponding parts, which are labeled with the same references, will therefore not be described again. The axial cross-section of this figure is also the same as that shown in FIG. 1.

The basic difference between the embodiment according to FIG. 8, as against the embodiment according to FIG. 1, is in the fact that thermostatic adjustment takes place on the passage 31 of hot water rather than on the passage 30 of cold water. Inlet passage 30 for cold water has its annular chamber 38 freely empty into mixing chamber 50. On the other hand, inlet passage 31 for hot water empties into an annular chamber 46, and the active annular part 48 of distribution slide valve 44 surrounds this annular chamber 46 and cooperates with a lower surface 50 presented by central body 28 to controllably restrict flow into mixing chamber 59.

This valve works in a manner identical to the one described earlier, but thermostatic adjustment following a dilation of thermostatic element 23 involves choking or restricting the passage of the hot water rather than widening the passage of the cold water. It follows from this that in case of any anomaly in cold water supply, the volume of mixed water is reduced enough to stay within the temperature limit set by the valve, and in case of total absence of cold water supply, the valve would cease to deliver water altogether.

In all of its embodiments, the thermostatic valve according to the invention can be used as thermostatic faucet that is operated in a progressive manner, making shell 25 of the valve rotate by virtue of the operation of handle 26.

However, it is also possible to use the valve to supply one or several apparatus, such as, for example, showerheads, each provided with its own volume control and intercept faucet or with one or several faucets inserted in the pipe downstream from the thermostatic valve. In this case, the thermostatic valve is adjusted manually only to set the desired temperature, while the volume and shut off valves are adjusted downstream on the faucets on the various apparatuses.

As with all thermostatic valves that do not act as a faucet, which as such do not ensure a separation between the hot water and cold water supply pipes, optional non-return valves in the lines may be inserted for ensuring this separation.

It must be understood that the invention is not confined to the embodiments described and illustrated by way of example. Some modifications have been described and others are within the reach of the expert in the field; for example, the shape and arrangement of the passage openings of plates 82 and 84 can be modified, provided they give rise to the succession of actions described earlier. The arrangement of other parts of the valve can also be modified. Cap 70 for adjusting the attainable temperature limit can be omitted when this adjustment is predetermined by way of design, or this adjustment can be performed with setting members that are accessible to the action of a technician but which the casual user cannot operate.

These and other modifications and any substitution with technical equivalents can be introduced in what was described and illustrated above without deviating from the scope of the invention and the coverage of this patent.

I claim:

1. A thermostatic mixing valve including a base having two supply ports for cold water and for hot water, a mixing chamber, passages between said supply ports and said mixing chamber, an outlet port leading from the mixing chamber for the mixed water, a thermostatic element arranged at least partly in said mixing chamber, an annular distribution slide valve controlled by the thermostatic element, said two supply ports and said outlet being made in a central body positioned inside said annular distribution slide valve, said thermostatic mixing valve characterized by:

said distribution slide valve is constructed to restrict and control the passage between only one of the supply ports and the mixing chamber, and that a manual control valve is interposed between said supply ports and said mixing valve to control flow through said two supply ports.

2. A thermostatic mixing valve as defined in claim 1, further characterized by:

said distribution slide valve is constructed to restrict, by action of the thermostatic element, only the passage through which hot water passes from the pertinent supply port to the mixing chamber.

3. A thermostatic mixing valve as defined in claim 1, further characterized by:

said distribution slide valve is constructed to restrict, by action of the thermostatic element, only the passage through which cold water passes from the pertinent supply port to the mixing chamber.

4. A thermostatic mixing valve according to claim 1, further characterized by:

the manual control valve has a pair of valve plates, provided with through opening, a first plate being fixed and a second plate being movable and in contact with the first fixed plate.

5. A thermostatic mixing valve according to claim 4, further characterized by:

said plates having their openings arranged in such positions as to ensure in succession a shut-off position, a range of progressive opening positions of the passages for cold water while retaining closure of the hot water passage, a range of progressive opening positions of the hot water passage while retaining full opening of the cold water and, finally, a progressive closing range of the cold water passage while retaining full opening of the hot water passage while said two plates each have a discharge opening permanently aligned to each other.

6. A thermostatic mixing valve according to claim 4, further characterized by:

said plates having their openings arranged in such positions as to ensure in succession a shut-off position, a range of progressive opening positions of the passages for cold water while retaining closure of the hot water passage and a range of positions in which takes place a progressive opening of the hot water passage and, simultaneously, a progressive closing of the cold water passage, said two plates each have a discharge opening permanently aligned to each other.

7. A thermostatic mixing valve according to claim 4 further characterized by:

said plates having their openings arranged in such positions as to ensure in succession a range of progressive opening positions of the hot water passage while retaining full opening of the cold water passage and a range of progressive closing of the cold water passage while retaining full opening of the hot water passage, said two plates each have a discharge opening permanently aligned to each other.

8. A thermostatic mixing valve according to claim 4, further characterized by:

said plates having their openings arranged in such positions as to ensure a range of positions in which takes place a progressive opening of the hot water passage and, simultaneously, a progressive closing of the cold water passage, said two plates each have a discharge opening permanently aligned with each other.

9. A thermostatic mixing valve according claim 5 further characterized by:

the openings of a first plate are arranged symmetrically with respect to a diameter, while the openings of a second plate, cooperating with the first plate, have an asymmetrical arrangement with respect to a diameter which, when the plates are in the shut-off position is aligned with said diameter of the first plate.

10. A thermostatic mixing valve according to claim 1 further, characterized by:

the valve has a base part, fixed upon a pipe fixture, and a rotatable body mounted on the base so that it can be rotated on said base part and mounts the operating member for the manual sequential control valve to provide progressive flow and mixing adjustment.

11. A thermostatic mixing valve according to claim 10, further characterized by:

said rotatable body of the valve comprises a shell equipped with a surrounding handle, shaped so as to facilitate the manual rotation operation of the rotatable part.

12. A thermostatic mixing valve according to claim 10 further, characterized by:

the fixed plate is mounted in said base and that the movable plate is mounted in said rotary body of the valve.

13. A thermostatic mixing valve according to claim 1, further characterized by:

a means for determining the maximum temperature at which the delivered water can be adjusted.

14. A thermostatic mixing valve according to claim 13, further characterized by:

said means for determining the maximum temperature of the delivered water including an adjustment mechanism for adjusting the resting position of the thermostatic element and of the annular slide valve connected to it.

15. A thermostatic mixing valve according to claim 14, further characterized by:

said adjustment mechanism for adjusting the resting position of the thermostatic element and of the annular distribution slide valve including a cap axially affixed to the thermostatic element that can be rotated by manual action mounted by means of a threaded connection screws on the valve, and whose axial shift, done by rotation, is transmitted to the thermostatic element.

16. A thermostatic mixing valve characterized by:

a base having two supply ports;

a rotatable body mounted onto said base and operably connected to a first valving surface with a first and second inlet passages therethrough that are operably positioned adjacent said two supply ports for controlling volume flow into said housing;

a second valving member being annular in shape and movable toward and away from an annular seat in proximity for restricting and controlling fluid only from said first inlet passage;

said first inlet passage passing up through said annular seating surface within radial extend of said annular valving surface and having a downstream end in fluid communication with said annular seat and said annular valving member to provide a first annular flow path between said annular seat and said annular valving member from radially within said annular valving member to radially outside of said annular valving surface to a mixing chamber;

said first inlet passage being sealed within the interior of said annular valving surface with respect to said second inlet passage from said supply ports to said mixing chamber;

a thermostatic element axially movably disposed within the mixing chamber and operably connected to said annular valving surface to move said annular valving surface axially toward and away from said annular seat for restricting controlling the flow form only the first inlet passage into said mixing chamber in response to the temperature of fluid in said mixing chamber;

the mixing chamber is in fluid communication with an outlet exiting therefrom.

17. A thermostatic mixing valve as defined in claim 16 further characterized by:

said annular seat opposing an axial end of said annular valving member;

said second inlet passage passing up through said first seating surface and through the interior of said annular valving surface within radial extent of said annular valving surface and having a downstream end in unrestricted fluid communication with said mixing chamber.

18. A thermostatic mixing valve as defined in claim 16 further characterized by:

said second inlet passage ending below said annular valving member to allow free unrestricted flow about said annular valving member to said mixing chamber;

said annular seat is positioned above said annular valving member and said first inlet passage passes up through the interior of said annular valving member.

19. A thermostatic mixing valve as defined in claim 16, further characterized by:

a return biasing spring mounted within the radially confines of the annular valving member to axially move said annular valving member upon contraction of said thermostatic element.

20. A thermostatic mixing valve as defined in claim 19 further characterized by:

said return biasing spring mounted on the top of a central body within said rotatable body.

* * * * *

UNITED STATES PATENT AND TRADEMARK OFFICE
CERTIFICATE OF CORRECTION

PATENT NO. : 6,341,731 B1
DATED : January 29, 2002
INVENTOR(S) : Alfons Knapp

It is certified that error appears in the above-identified patent and that said Letters Patent is hereby corrected as shown below:

<u>Title page,</u>
Item [57], ABSTRACT, please delete the current ABSTRACT and insert therein:
-- A thermostatic mixing valve includes two inlet ports for cold water and for hot water, a mixing chamber, passages between the inlet ports and the mixing chamber, an outlet passage and port from the mixing chamber for the mixed water, a thermostatic element arranged at least partly in the mixing chamber and a distribution slide valve controlled by the thermostatic element. The two inlet passages and the outlet passage are made in a central body arranged inside the distribution slide valve in which the distribution slide valve is arranged so as to modify the passages between only one of the outlet passages and tine mixing chamber. A sequential manual control valve is inserted so as to control the two passages. The sequential manual valve comprises a fixed plate and a rotatable plate mounted in such a way that it can be rotated on the fixed plate. --

<u>Column 1,</u>
Line 32, after "Patent No." there is an extra number in 1,2273,178. The correct Patent No. is 1,273,178.
Line 51, after "phenomena" delete "of" and insert therein -- often --.

<u>Column 3,</u>
Line 9, after "used" insert therein -- as --.

<u>Column 4,</u>
Line 11, after "flow" delete "form" and insert therein -- from --.
Line 67, after "that can be" delete "quipped" and insert therein -- equipped --.

<u>Column 5,</u>
Line 12, after "downstream end" delete "40" and insert therein -- 46 --.
Line 27, after "valve" delete "4T" and insert therein -- 44 --.

<u>Column 6,</u>
Line 61, after "line" delete "I-I" and insert therein -- 1-1 --.

UNITED STATES PATENT AND TRADEMARK OFFICE
CERTIFICATE OF CORRECTION

PATENT NO. : 6,341,731 B1
DATED : January 29, 2002
INVENTOR(S) : Alfons Knapp

It is certified that error appears in the above-identified patent and that said Letters Patent is hereby corrected as shown below:

<u>Column 9,</u>
Line 51, after "provided with" delete "through opening" and insert therein -- openings therethrough --.

<u>Column 10,</u>
Line 28, after "according" insert therein -- to --.

Signed and Sealed this

Twenty-ninth Day of October, 2002

*Attest:*

*Attesting Officer*

JAMES E. ROGAN
*Director of the United States Patent and Trademark Office*